United States Patent
Humpal et al.

(10) Patent No.: US 10,155,834 B2
(45) Date of Patent: Dec. 18, 2018

(54) FREE RADICALLY POLYMERIZABLE SILOXANES AND SILOXANE POLYMERS

(71) Applicant: 3M INNOVATIVE PROPERTIES COMPANY, St. Paul, MN (US)

(72) Inventors: Paul E. Humpal, Stillwater, MN (US); Audrey A. Sherman, Woodbury, MN (US); Mieczyslaw H. Mazurek, Roseville, MN (US); Bradley A. Craig, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/537,650

(22) PCT Filed: Dec. 15, 2015

(86) PCT No.: PCT/US2015/065445
§ 371 (c)(1),
(2) Date: Jun. 19, 2017

(87) PCT Pub. No.: WO2016/105986
PCT Pub. Date: Jun. 30, 2016

(65) Prior Publication Data
US 2018/0002471 A1    Jan. 4, 2018

Related U.S. Application Data

(60) Provisional application No. 62/095,157, filed on Dec. 22, 2014.

(51) Int. Cl.
| | |
|---|---|
| C08F 290/14 | (2006.01) |
| C08G 77/388 | (2006.01) |
| C08F 230/08 | (2006.01) |
| C08G 77/455 | (2006.01) |
| C08L 83/10 | (2006.01) |
| C08G 77/38 | (2006.01) |

(52) U.S. Cl.
CPC ........ *C08F 290/148* (2013.01); *C08F 230/08* (2013.01); *C08G 77/38* (2013.01); *C08G 77/388* (2013.01); *C08G 77/455* (2013.01); *C08L 83/10* (2013.01)

(58) Field of Classification Search
CPC .................................................. C08G 77/455
See application file for complete search history.

(56) References Cited

U.S. PATENT DOCUMENTS

| | | | |
|---|---|---|---|
| 6,534,615 B2 | 3/2003 | Schafer | |
| 7,501,184 B2 | 3/2009 | Leir | |
| 7,705,101 B2 | 4/2010 | Sherman | |
| 7,705,103 B2 | 4/2010 | Sherman | |
| 8,361,626 B2 | 1/2013 | Sherman | |
| 8,614,281 B2 | 12/2013 | Hansen | |
| 2007/0149745 A1 | 6/2007 | Leir | |
| 2018/0126706 A1* | 5/2018 | Erdogan-Haug | B32B 7/02 |

FOREIGN PATENT DOCUMENTS

WO    WO 2015-191436    12/2015

OTHER PUBLICATIONS

International Search Report for PCT International Application No. PCT/US2015/065445, filed May 6, 2016, 4 pages.

* cited by examiner

Primary Examiner — Marc S Zimmer
(74) Attorney, Agent, or Firm — Jeffrey M. Olofson

(57) ABSTRACT

Free radically polymerizable synthons for preparing siloxane polyoxamide copolymers are prepared by reacting amine-terminated siloxane polyoxamide compounds with an isocyanate-functional (meth)acrylate, an isocyanate-functional vinyl-substituted aromatic compound, or a vinyl azlactone. These free radically polymerizable synthons can be used to prepare polymer compositions by combining the free radically polymerizable synthons with an initiator and initiating polymerization.

20 Claims, No Drawings

FREE RADICALLY POLYMERIZABLE SILOXANES AND SILOXANE POLYMERS

FIELD OF THE DISCLOSURE

The present disclosure relates generally to reactive siloxane compounds, specifically free radically polymerizable siloxane compounds, especially siloxane polyoxamide compounds, and polymers prepared from the reactive siloxane compounds.

BACKGROUND

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides and polydiorganosiloxane polyureas are exemplary block copolymers.

Polydiorganosiloxane polyamides have been prepared by condensation reactions of amino terminated silicones with short-chained dicarboxylic acids. Alternatively, these copolymers have been prepared by condensation reactions of carboxy terminated silicones with short-chained diamines. Because polydiorganosiloxanes (e.g., polydimethylsiloxanes) and polyamides often have significantly different solubility parameters, it can be difficult to find reaction conditions for production of siloxane-based polyamides that result in high degrees of polymerization, particularly with larger homologs of the polyorganosiloxane segments. Many of the known siloxane-based polyamide copolymers contain relatively short segments of the polydiorganosiloxane (e.g., polydimethylsiloxane) such as segments having no greater than about 30 diorganosiloxy (e.g., dimethylsiloxy) units or the amount of the polydiorganosiloxane segment in the copolymer is relatively low. That is, the fraction (i.e., amount based on weight) of polydiorganosiloxane (e.g., polydimethylsiloxane) soft segments in the resulting copolymers tends to be low.

Polydiorganosiloxane polyureas are another type of block copolymer. Although these block copolymers have many desirable characteristics, some of them tend to degrade when subjected to elevated temperatures such as 250° C. or higher.

Polydiorganosiloxane polyoxamide block copolymers have been developed and have not only the many desirable characteristics of siloxane polymers but have enhanced thermal stability due to the polyoxamide linking groups. Among the patents describing these polydiorganosiloxane polyoxamide polymers include U.S. Pat. Nos. 8,361,626, 7,705,103, and 7,705,101 (Sherman et al.). Moisture-curable polydiorganosiloxane polyoxamide compounds are described in U.S. Pat. No. 8,614,281 (Hansen et al.).

SUMMARY

The present disclosure relates to reactive siloxane compounds, specifically free radically polymerizable siloxane compounds, especially siloxane polyoxamide compounds, and polymers prepared from the reactive siloxane compounds.

In some embodiments, the free radically polymerizable compound comprises the formula:

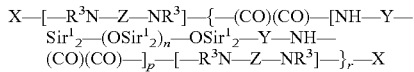

where each $R^1$ is independently an alkyl, haloalkyl, aralkyl, aryl, or aryl substituted with an alkyl, alkoxy, or halo; each Y is independently a divalent alkylene, aralkylene, or a combination thereof; each Z is independently a divalent or higher-valent polydiorganosiloxane, alkylene, aralkylene, heteroalkylene, or branched alkylene group; each $R^3$ is hydrogen or alkyl or $R^3$ taken together with Z and with the nitrogen to which they are both attached forms a heterocyclic group; each X is independently a free radically polymerizable group; n is independently an integer of 0 to 1500; p is an integer of 1 or greater; and r is an integer of 1 or greater.

In some embodiments, the methods of making free radically polymerizable compounds comprise mixing together under reaction conditions a compound of the formula:

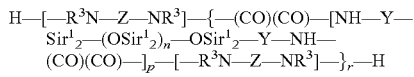

where each $R^1$ is independently an alkyl, haloalkyl, aralkyl, aryl, or aryl substituted with an alkyl, alkoxy, or halo; each Y is independently a divalent alkylene, aralkylene, or a combination thereof; each Z is independently a divalent or higher-valent polydiorganosiloxane, alkylene, aralkylene, heteroalkylene, or branched alkylene group; each $R^3$ is hydrogen or alkyl or $R^3$ taken together with Z and with the nitrogen to which they are both attached forms a heterocyclic group; n is independently an integer of 0 to 1500; p is an integer of 1 or greater; and r is an integer of 1 or greater; and an amine-reactive compound, where the amine-reactive compound comprises an isocyanate-functional (meth)acrylate, an isocyanate-functional vinyl-substituted aromatic compound, or a vinyl azlactone.

Embodiments of polymer compositions include one or more polymers and may optionally include one or more additives. The polymers are prepared from a reaction mixture comprising at least one free radically polymerizable compound described above, and an initiator. In some embodiment the initiator is a photoinitiator. The reaction mixture may include additional free radically polymerizable monomers, crosslinking agents, and the like.

DETAILED DESCRIPTION

Free radically polymerizable siloxane compounds and methods of preparing free radically polymerizable siloxane compounds are presented. The free radically polymerizable siloxane compounds may be readily prepared from a wide array of precursor molecules. The free radically polymerizable siloxane compounds can be used to prepare a wide variety of siloxane polymers. The siloxane polymers may be crosslinked or uncrosslinked, and may be elastomeric or release polymers. The elastomeric polymers can be used to prepare pressure sensitive adhesives by the addition of silicone tackifying resins. The polymers prepared from the free radically polymerizable siloxane compounds of this disclosure have many of the desirable features of polysiloxanes such as low glass transition temperatures, thermal and oxidative stability, resistance to ultraviolet radiation, low surface energy and hydrophobicity, high permeability to many gases, and insensitivity to humidity. Additionally, because the polymers are prepared from free radically polymerizable siloxane compounds prepared from siloxane polyoxamides, the formed polymers can have improved mechanical strength and thermal stability due to these groups. In some embodiments, the polymers have desirable optical properties such as being optically clear or having a low refractive index or even a combination of these properties.

The terms "a", "an", and "the" are used interchangeably with "at least one" to mean one or more of the elements being described.

The term "adhesive" as used herein refers to polymeric compositions useful to adhere together two adherends. Examples of adhesives are heat activated adhesives, and pressure sensitive adhesives.

Heat activated adhesives are non-tacky at room temperature but become tacky and capable of bonding to a substrate at elevated temperatures. These adhesives usually have a glass transition temperature ($T_g$) or melting point ($T_m$) above room temperature. When the temperature is elevated above the $T_g$ or $T_m$, the storage modulus usually decreases and the adhesive become tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "free radically polymerizable" as used herein refers to materials that contain groups that participate in free radical polymerization reactions. Examples of free radically polymerizable groups are ethylenically unsaturated groups, such as vinyl groups and (meth)acrylate groups.

The term "(meth)acrylate" encompasses both acrylates and methacrylates. Acrylates are the esters of acrylic acid, and methacrylates are the esters of methacrylic acid.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent or trivalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula —$R^a$—Ar where $R^a$ is an alkylene and Ar is an aryl group. That is, the aralkyl is an alkyl substituted with an aryl.

The term "aralkylene" refers to a divalent or trivalent group of formula —$R^a$—$Ar^a$— where $R^a$ is an alkylene and $Ar^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent or trivalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "carbonyl" refers to a divalent group of formula —(CO)— where the carbon atom is attached to the oxygen atom with a double bond.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "heteroalkylene" refers to a divalent or trivalent group that includes at least two alkylene groups connected by a thio, oxy, or —NR— where R is alkyl. The heteroalkylene can be linear, branched, cyclic, or combinations thereof and can include up to 120 carbon atoms and up to 40 heteroatoms. In some embodiments, the heteroalkylene includes up to 105 carbon atoms, up to 60 carbon atoms, up to 50 carbon atoms, up to 20 carbon atoms, or up to 10 carbon atoms. Some heteroalkylenes are polyalkylene oxides where the heteroatom is oxygen.

The term "oxamido ester" refers to a group of formula $R^a$O—(CO)—(CO)—$NR^b$— where each (CO) denotes a carbonyl, $R^a$ is an alkyl, haloalkyl, aryl, or aryl substituted with an alkyl, alkoxy, halo, or alkoxycarbonyl, or imino of formula —N=$CR^8R^9$ where $R^8$ is hydrogen, alkyl, aralkyl, substituted aralkyl, aryl, or substituted aryl, and $R^9$ is alkyl, aralkyl, substituted aralkyl, aryl, or substituted aryl, and $R^b$ is hydrogen or an alkyl group.

The term "imino" refers to a group of formula —N=$CR^8R^9$ where the $R^8$ group is hydrogen, alkyl, aralkyl, substituted aralkyl, aryl, or substituted aryl and the $R^9$ group is alkyl, aralkyl, substituted aralkyl, aryl, or substituted aryl.

The terms "polymer" and "polymeric material" refer to both materials prepared from one monomer such as a homopolymer or to materials prepared from two or more monomers such as a copolymer, terpolymer, or the like Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The term "polydiorganosiloxane" refers to a divalent segment of formula

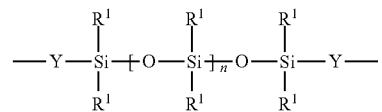

where each $R^1$ is independently an alkyl, haloalkyl, aralkyl, aryl, or aryl substituted with an alkyl, alkoxy, or halo; each Y is independently an alkylene, aralkylene, or a combination thereof; and subscript n is independently an integer of 0 to 1500.

The terms "room temperature" and "ambient temperature" are used interchangeably to mean temperatures in the range of 20° C. to 25° C.

The terms "Tg" and "glass transition temperature" are used interchangeably. If measured, Tg values are determined by Differential Scanning Calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is understood by one of skill in the art.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

The free radically polymerizable siloxane compounds of this disclosure are useful synthons for the preparation of wide range of siloxane materials. The free radically polymerizable siloxane compounds may be described as oxamido siloxanes with terminal free radically polymerizable groups. The free radically polymerizable siloxane compounds can be polymerized to form elastomeric siloxane polymers or copolymerized with other free radically polymerizable materials to form a wide range of hybrid materials. The synthons can be polymerized immediately after preparation to generate siloxane polymers or copolymers, or the synthons can be mixed with other materials to form a reactive composition that is cured at a later time. Such reactive compositions are sometimes referred to as "cure on demand" compositions as they do not cure until desired by the user.

Free radical polymerization is triggered by an activation mechanism. With these types of free radically polymerizable materials the activation mechanism is the generation of free radicals. The activating free radicals are typically generated either through the use of an activatable free radical initiator or through the use of ionizing radiation such as an electron beam. Various types of free radical initiators are available, such as thermal initiators photoinitiators.

The free radically polymerizable siloxane compounds of this disclosure are suitable for use in a wide range of applications, including optical, medical, dental, electronic, and industrial applications.

The general structure of these free radically polymerizable siloxane compounds is described by Formula I below, which is a segmented compound:

X—[—R³N—Z—NR³]—{—(CO)(CO)—[NH—Y—Sir¹₂—(OSir¹₂)ₙ—OSir¹₂—Y—NH—(CO)(CO)—]ₚ—[—R³N—Z—NR³]—}ᵣ—X     Formula I where each $R^1$ is independently an alkyl, haloalkyl, aralkyl, aryl, or aryl substituted with an alkyl, alkoxy, or halo; each Y is independently a divalent alkylene, aralkylene, or a combination thereof; each Z is independently a divalent or higher-valent polydiorganosiloxane, alkylene, aralkylene, heteroalkylene, or branched alkylene group; each $R^3$ is hydrogen or alkyl or $R^3$ taken together with Z and with the nitrogen to which they are both attached forms a heterocyclic group; each X is independently a free radically polymerizable group; n is independently an integer of 0 to 1500; p is an integer of 1 or greater; and r is an integer of 1 or greater.

Typically at least 50% of the $R^1$ groups are methyl groups, in some embodiments all of the $R^1$ groups are methyl groups. This makes the —(OSiR¹₂)— repeating group a polydimethyl siloxane repeating group.

Each Y is independently a divalent alkylene, aralkylene, or a combination thereof. The Y group is a linking group that links the terminal silicon atom of the siloxane repeating group to an amino group. Typically Y is a divalent alkylene group with 1 to 4 carbon atoms, in some specific embodiments it is a divalent propylene group.

Each Z is independently: a divalent polydiorganosiloxane group of the general structure —Y—SiR¹₂—(OSiR¹₂)ₘ—OSiR¹₂—Y—, where m is an integer of 0 to 1500, where Y and $R^1$ are as defined above; or a divalent, trivalent, or tetravalent linear or branched alkylene, aralkylene, or heteroalkylene. Z is a residue unit of a diamine or polyamine of the formula Z(NHR³)_q minus the q —NHR³ groups, and q is an integer greater than or equal to 2. Typically q is equal to 2, 3, or 4, such that when q is 2 the Z group is divalent, when q is 3 the Z group is trivalent, when q is 4 the Z group is tetravalent. Group $R^3$ is hydrogen or alkyl (e.g., an alkyl having 1 to 10, 1 to 6, or 1 to 4 carbon atoms) or $R^3$ taken together with Z and with the nitrogen to which they are both attached forms a heterocyclic group (e.g., R³HN—Z—NHR³ is piperazine or the like). In most embodiments, $R^3$ is hydrogen or an alkyl. In many embodiments, all of the amino groups of the diamine and/or polyamine are primary amino groups (i.e., all the $R^3$ groups are hydrogen) and the diamine and/or polyamine are of the formula Z(NH₂)_q (e.g., a diamine of the formula R³HN—Z—NHR³ when q=2).

In certain embodiments, Group Z in Formula I is a mixture of residual units that are equal to (i) a diamine compound of the formula R³HN—Z—NHR³ minus the two amino groups (i.e., —NHR³ groups) and (ii) a polyamine compound of the formula Z(NHR³)_q minus the q amino groups (i.e., —NHR³ groups), where q is an integer greater than 2. In such embodiments, the polyamine compound of formula Z(NHR³)_q can be, but is not limited to, triamine compounds (i.e., q=3), tetraamine compounds (i.e., q=4), and combinations thereof.

When Z includes residual units that are equal to (i) a diamine compound of formula R³HN—Z—NHR³ minus the two amino groups (i.e., —NHR³ groups), Z can be a —Y—SiR¹₂—(OSiR¹₂)ₘ—OSiR¹₂—Y— group as described above, or a linear or branched divalent alkylene, heteroalkylene, arylene, aralkylene, or a combination thereof. Suitable —Y—SiR¹₂—(OSiR¹₂)ₘ—OSiR¹₂—Y— groups are ones where at least 50% of the $R^1$ groups are methyl groups, each Y is an alkylene groups with 1 to 4 carbon atoms, and m is integer of 0 to 1500. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group Z, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene).

In one exemplary alkylene-arylene-alkylene combination, the arylene is phenylene and each alkylene has 1 to 10, 1 to 6, or 1 to 4 carbon atoms.

Each X is independently a free radically polymerizable group. A wide variety of free radically polymerizable groups are suitable. In some embodiments each X group comprises a (meth)acrylate group, an acrylamide group, or an ethylenically unsaturated aromatic group. Exemplary X groups have the structure: —A—O—(CO)—CR$^4$=CH$_2$ (a (meth)acrylate group); —A—(CO)—CR$^5{}_2$—NH—(CO)—CH=CH$_2$ (an acrylamide group); or —A—Ar—CR$^4$=CH$_2$ (an ethylenically unsaturated aromatic group); where each A is a single bond or a linking group comprising —(CO)—NH—B—, where B is an alkylene group of from 1-4 carbon atoms; each R$^4$ is a hydrogen atom or an alkyl group of 1-4 carbon atoms; each R$^5$ is a methyl group; and Ar is a substituted or unsubstituted aromatic group.

Among the particularly suitable X groups are ones in which the X group comprises a group with the structure: —A—O—(CO)—CR$^4$=CH$_2$, where A is a linking group comprising —(CO)—NH—B—, where B is an ethylene group; and R$^4$ is a hydrogen atom or a methyl group.

In other embodiments, the X group comprises a group with the structure: —A—(CO)—CR$^5{}_2$—NH—(CO)—CH=CH$_2$, where A is a single bond; and each R$^5$ is a methyl group.

In still other embodiments, the X group comprises a group with the structure: —A—Ar—CR$^4$=CH$_2$, where A is a linking group comprising —(CO)—NH—B—, where B is a dimethyl substituted methylene group; R$^4$ is a hydrogen atom or a methyl group: and Ar is a phenylene group.

The above described free radically polymerizable siloxane compounds can be prepared from a variety of different materials. In general, the free radically polymerizable siloxane compounds are prepared by mixing under reaction conditions an amino-functional compound of Formula II, shown below, with an amine-reactive compound, wherein the amine-reactive compound comprises an isocyanate-functional (meth)acrylate, an isocyanate-functional vinyl-substituted aromatic compound, or a vinyl azlactone.

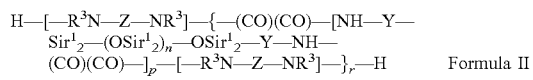

Formula II where each R$^1$ is independently an alkyl, haloalkyl, aralkyl, aryl, or aryl substituted with an alkyl, alkoxy, or halo; each Y is independently a divalent alkylene, aralkylene, or a combination thereof; each Z is independently a divalent or higher-valent polydiorganosiloxane alkylene, aralkylene, heteroalkylene, or branched alkylene group; each R$^3$ is hydrogen or alkyl or R$^3$ taken together with Z and with the nitrogen to which they are both attached forms a heterocyclic group; n is independently an integer of 0 to 1500; p is an integer of 1 or greater; and r is an integer of 1 or greater.

Typically at least 50% of the R$^1$ groups are methyl groups, in some embodiments all of the R$^1$ groups are methyl groups. This makes the —(OSiR$^1{}_2$)— repeating group a polydimethyl siloxane repeating group.

Each Y is independently a divalent alkylene, aralkylene, or a combination thereof. The Y group is a linking group that links the terminal silicon atom of the siloxane repeating group to an amino group. Typically Y is a divalent alkylene group with 1 to 4 carbon atoms, in some specific embodiments it is a divalent propylene group.

Each Z is independently: a divalent polydiorganosiloxane group of the general structure —Y—SiR$^1{}_2$—(OSiR$^1{}_2$)$_m$—OSiR$^1{}_2$—Y—, where m is an integer of 0 to 1500, where Y and R$^1$ are as defined above; or a divalent, trivalent, or tetravalent linear or branched alkylene, aralkylene, or heteroalkylene. Z is a residue unit of a diamine or polyamine of the formula Z(NHR$^3$)$_q$ minus the q —NHR$^3$ groups, and q is an integer greater than or equal to 2. Typically q is equal to 2, 3, or 4, such that when q is 2 the Z group is divalent, when q is 3 the Z group is trivalent, when q is 4 the Z group is tetravalent. Group R$^3$ is hydrogen or alkyl (e.g., an alkyl having 1 to 10, 1 to 6, or 1 to 4 carbon atoms) or R$^3$ taken together with Z and with the nitrogen to which they are both attached forms a heterocyclic group (e.g., R$^3$HN—Z—NHR$^3$ is piperazine or the like). In most embodiments, R$^3$ is hydrogen or an alkyl. In many embodiments, all of the amino groups of the diamine and/or polyamine are primary amino groups (i.e., all the R$^3$ groups are hydrogen) and the diamine and/or polyamine are of the formula Z(NH$_2$)$_q$ (e.g., a diamine of the formula R$^3$HN—Z—NHR$^3$ when q=2).

In certain embodiments, Group Z in Formula I is a mixture of residual units that are equal to (i) a diamine compound of the formula R$^3$HN—Z—NHR$^3$ minus the two amino groups (i.e., —NHR$^3$ groups) and (ii) a polyamine compound of the formula Z(NHR$^3$)$_q$ minus the q amino groups (i.e., —NHR$^3$ groups), where q is an integer greater than 2. In such embodiments, the polyamine compound of formula Z(NHR$^3$)$_q$ can be, but is not limited to, triamine compounds (i.e., q=3), tetraamine compounds (i.e., q=4), and combinations thereof.

When Z includes residual units that are equal to (i) a diamine compound of formula R$^3$HN—Z—NHR$^3$ minus the two amino groups (i.e., —NHR$^3$ groups), Z can be a —Y—SiR$^1{}_2$—(OSiR$^1{}_2$)$_m$—OSiR$^1{}_2$—Y— group as described above, or a linear or branched divalent alkylene, heteroalkylene, arylene, aralkylene, or a combination thereof. Suitable —Y—SiR$^1{}_2$—(OSiR$^1{}_2$)$_m$—OSiR$^1{}_2$—Y— groups are ones where at least 50% of the R$^1$ groups are methyl groups, each Y is an alkylene groups with 1 to 4 carbon atoms, and m is integer of 0 to 1500. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group Z, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

The amine-functional siloxane compounds of Formula II can be prepared from a variety of starting materials, and the selection of these starting materials greatly impacts not only the properties of the amine-functional siloxane compounds of Formula II, but also the free radically polymerizable siloxane compounds of Formula I formed from them, as well as the polymers made from the free radically polymerizable siloxane compounds of Formula I.

A variety of different pathways can be used to generate the amine-functional compound of Formula II. Each of these pathways involve the use of a polydiorganosiloxane diamine of Formula III, an oxylate of Formula IV, and a diamine or polyamine of Formula V. Each of these compounds is shown below.

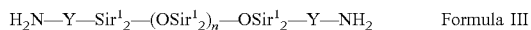   Formula III

   Formula IV

   Formula V

Where $R^1$, Y, $R^3$, and Z are as defined above, and each group $R^2$ is independently an alkyl, haloalkyl, aryl, or aryl substituted with an alkyl, alkoxy, halo, alkoxycarbonyl, or imino of formula —N=$CR^8R^9$ where $R^8$ is hydrogen, alkyl, aralkyl, substituted aralkyl, aryl, or substituted aryl, and $R^9$ is alkyl, aralkyl, substituted aralkyl, aryl, or substituted aryl. Suitable alkyl and haloalkyl groups for $R^2$ often have 1 to 10, 1 to 6, or 1 to 4 carbon atoms. Although tertiary alkyl (e.g., tert-butyl) and haloalkyl groups can be used, there is often a primary or secondary carbon atom attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or a fluoroalkyl groups can be chloromethyl, 2-chloroethyl, 2,2,2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Suitable aryl groups for $R^2$ include those having 6 to 12 carbon atoms such as, for example, phenyl. An aryl group can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), or alkoxycarbonyl (e.g., an alkoxycarbonyl having 2 to 5 carbon atoms such as methoxycarbonyl, ethoxycarbonyl, or propoxycarbonyl). Suitable imino groups of formula —N=$CR^8R^9$ are ones where $R^8$ and $R^9$ are alkyl groups that are linear or branched and typically contain 1 to 10 carbon atoms, 1 to 8 carbon atoms, 1 to 6 carbon atoms, or 1 to 4 carbon atoms or aryl, substituted aryl, aralkyl, and substituted aralkyl groups with from 6 to 12 carbon atoms. Especially suitable groups $R^2$ include alkyls having 1 to 4 carbon atoms, haloalkyls having 1 to 4 carbon atoms, phenyl, and imino.

The building block compounds of Formulas III-V can be reacted in various reaction pathways to prepare the amine-functional compound of Formula II.

In one reaction pathway an intermediate polydiorganosiloxane-containing oxamide of Formula VI is generated as shown in Reaction Scheme A below. In Formula VI, $R^1$, $R^2$, Y, n, and p are the same as previously described.

In Reaction scheme A, the polydiorganosiloxane diamine of Formula III is reacted with a molar excess of an oxalate of Formula IV under an inert atmosphere to produce the polydiorganosiloxane-containing oxamide of Formula VI and $R^2$—OH by-product. In this reaction, $R^1$, $R^2$, Y, n, and p are the same as previously described. The preparation of the oxamide of Formula II according to Reaction Scheme A is further described in US Patent Publication No. 2007/0149745 (Leir et al.) and U.S. Pat. No. 7,501,184 (Leir et al.).

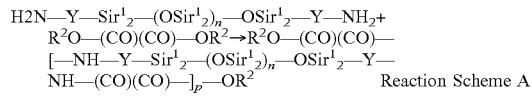   Reaction Scheme A

The polydiorganosiloxane-containing oxamide of Formula VI can then be further reacted with diamine or polyamine of Formula V to generate the amine-functional compound of Formula II. It should be noted that if the amine of Formula V is greater than difunctional, the resulting amine-functional compound of Formula II will also be greater than difunctional, as has been explained above. This is illustrated in Reaction Scheme B below. In this reaction, $R^1$, $R^2$, $R^3$, Y, Z, n, p, and r are the same as previously described.

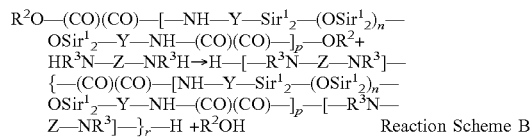   Reaction Scheme B

The amine-functional compound generated by Reaction Scheme B can then be reacted with an amine-reactive compound that contains a free radically polymerizable group to form the free radically polymerizable compound of Formula I, as is described below.

An alternative reaction pathway to the amine-functional compound of Formula II and thus to the free radically polymerizable compound of Formula I involves the reaction of the diamine or polyamine of Formula V with the oxalate of Formula IV to generate a different oxamide, that of Formula VII below. The reaction sequence is show in Reaction Scheme C below. In this reaction, $R^2$, $R^3$, and Z are as previously described.

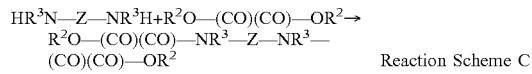   Reaction Scheme C

The oxamide of Formula VII can then be further reacted with the polydiroganosiloxane diamine of Formula III to generate the amine-functional compound of Formula II. This is illustrated in Reaction Scheme D below. In this reaction, $R^1$, $R^2$, $R^3$, Y, Z, n, and r are the same as previously described and p is equal to 1.

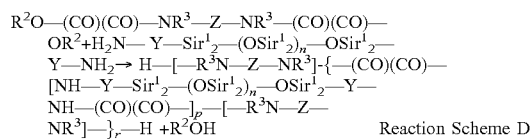   Reaction Scheme D

Formula VI

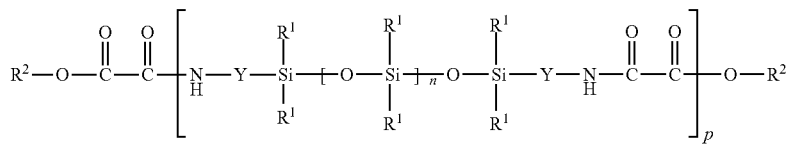

The amine-functional compound generated by Reaction Scheme B can then be reacted with an amine-reactive compound that contains a free radically polymerizable group to form the free radically polymerizable compound of Formula I, as explained below.

The diamine or polyamine of Formula II is reacted with a bifunctional capping compound that contains an amine-reactive group and a free radically polymerizable group. Typically the amine-reactive group is an azlactone group or an isocyanate group. The amine-reactive groups react with the terminal amine groups on the diamine or polyamine of Formula II to produce a capped compound where the capping groups are free radically polymerizable groups.

The reaction of an amine with an azlactone involves nucleophilic addition of the amine to the azlactone carbonyl, resulting in ring opening with retention of the vinyl group as an acrylamide. Vinyl dimethyl azlactone is a well-known compound known to readily react with primary amine groups to form a vinyl functional material.

A variety of different isocyanate-functional materials are also suitable. Isocyanates readily react with amines to form a urea linkage. Among the useful isocyanate-functional materials useful as the amine-reactive compound are isocyanate-functional (meth)acrylates and isocyanate-functional vinyl aromatic compounds.

Examples of suitable amine-reactive compounds include dimethyl azlactone, or a group with the structures: OCN—A—O—(CO)—CR$^4$=CH$_2$; or OCN—A—Ar—CR$^4$=CH$_2$, where each A is a linking group comprising an alkylene group of from 1-4 carbon atoms; each R$^4$ is a hydrogen atom or an alkyl group of 1-4 carbon atoms; Ar is a substituted or unsubstituted aromatic group.

In some embodiments, the amine-reactive compound comprises a group with the structure: OCN—A—O—(CO)—CR$^4$=CH$_2$, where A is an ethylene group; and R$^4$ is a hydrogen atom or a methyl group.

In other embodiments, the amine-reactive compound comprises a group with the structure: OCN—A—Ar—CR$^4$=CH$_2$, where A is a dimethyl substituted methylene group; R$^4$ is a hydrogen atom or a methyl group: and Ar is a phenylene group.

As mentioned above, the free radically polymerizable compounds of Formula I can be used as polymer synthons to generate a wide variety of polymers and copolymers. In some embodiments, the free radically polymerizable compounds of Formula I are homopolymerized to generate a siloxane-containing elastomeric homopolymer. In other embodiments, the free radically polymerizable compounds of Formula I can be copolymerized with other free radically polymerizable compounds to form copolymers with a wide range of properties.

Among the copolymerizable compounds suitable for copolymerization with the free radically polymerizable compounds of Formula I are alkyl (meth)acrylate monomers, reinforcing monomers, and vinyl monomers. Additionally, the reaction mixture may also contain one or more crosslinking agents.

Alkyl (meth)acrylate monomers typically have a homopolymer Tg of no greater than about 0° C. Typically, the alkyl group of the (meth)acrylate has an average of about 4 to about 20 carbon atoms, or an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, polyethoxylated or -propoxylated methoxy (meth)acrylates such as acrylates of CARBOWAX (commercially available from Union Carbide) and NK ester AM90G (commercially available from Shin Nakamura Chemical, Ltd., Japan). Suitable monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer.

Reinforcing monomers are typically monomers that increase the glass transition temperature and cohesive strength of the copolymer. Generally, reinforcing monomers have a homopolymer Tg of at least about 10° C. Typically, the reinforcing monomer is a reinforcing (meth)acrylic monomer, including an acrylic acid, a methacrylic acid, an acrylamide, or a (meth)acrylate. Examples of reinforcing monomers include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N, N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of reinforcing monomers include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Particularly suitable reinforcing acrylic monomers include acrylic acid and acrylamide.

Examples of suitable vinyl monomers include aromatic vinyl monomers such as styrene and substituted styrene, and vinyl esters such as vinyl acetate. Additionally, a variety of compounds with terminal ethylene groups of the general structure: H$_2$C=CH—R where R can be alkyl group or an alkyl group substituted with double bonds. An example of a vinyl monomer with an alkyl group substituted with double bonds is butadiene.

One class of useful crosslinking agents include multifunctional (meth)acrylate species. Multifunctional (meth)acrylates include tri(meth)acrylates and di(meth)acrylates (that is, compounds comprising three or two (meth)acrylate groups). Typically di(meth)acrylate crosslinkers (that is, compounds comprising two (meth)acrylate groups) are used. Useful tri(meth)acrylates include, for example, trimethylolpropane tri(meth)acrylate, propoxylated trimethylolpropane triacrylates, ethoxylated trimethylolpropane triacrylates, tris (2-hydroxy ethyl)isocyanurate triacrylate, and pentaerythritol triacrylate. Useful di(meth)acrylates include, for example, ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylates, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth)acrylates, and urethane di(meth)acrylates.

For some embodiments, another useful class of crosslinking agents contain functionality which is reactive with carboxylic acid groups on the acrylic copolymer when a carboxylic acid group is present (for example through the use of the reinforcing monomers described above). Examples of such crosslinkers include multifunctional aziridine, isocyanate, epoxy, and carbodiimide compounds. Examples of aziridine-type crosslinkers include, for example 1,4-bis(ethyleneiminocarbonylamino)benzene, 4,4'-bis(ethyleneiminocarbonylamino)diphenylmethane, 1,8-bis(ethyleneiminocarbonylamino)octane, and 1,1'-(1,3-phenylene dicarbonyl)-bis-(2-methylaziridine). The aziridine crosslinker 1,1'-(1,3-phenylene dicarbonyl)-bis-(2-methylaziridine) (CAS No. 7652-64-4), commonly referred to as "Bisamide" is particularly useful. Common polyfunctional isocyanate crosslinkers include, for example, trimethylolpropane toluene diisocyanate, tolylene diisocyanate, and hexamethylene diisocyanate.

Polymers of this disclosure can be prepared by preparing a reaction mixture comprising a free radically polymerizable compound of Formula I, and an initiator. As mentioned above, the reaction mixture may also contain other optional copolymerizable monomers. Additionally, if the formed polymer is to be part of a composition, additional optional additives can be added to the reaction mixture as well. Compositions, as used herein, refer to polymers, mixtures of polymers, and mixtures that contain one or more polymers and also contain at least one additional component. An example of a composition of this disclosure is a pressure sensitive adhesive which contains a siloxane-based polymer prepared from the reaction product of a free radically polymerizable compound of Formula I, and an initiator, and also contains at least one tackifying resin.

A wide variety of polymer compositions can be prepared using the free radically polymerizable compounds of Formula I as polymer synthons. These compositions can be made by mixing together the free radically polymerizable compound of Formula I, optional reactive comonomers and/or crosslinking agents, any desired additives, and an initiator. Such a composition is sometimes referred to as "a curable composition". The composition remains in the uncured state until activation of the initiator at which point the free radically polymerizable compound of Formula I and any copolymerizble monomers cure to form a polymer network. This process is sometimes referred to as a "cure in place" or "cure on demand" process since the composition is placed in a desired location and then activated to form the cured composition.

Other compositions can be prepared by polymerizing the free radically polymerizable compound of Formula I and any copolymerizable monomers to form a polymer network and then blending in any desired additives.

A wide variety of additives are suitable in the polymer compositions of this disclosure, depending upon the desired use for the composition. Examples of suitable additives include polymeric or copolymeric additives, tackifying resins, plasticizers, fillers, stabilizers, property modifiers, and the like. Examples of polymeric and copolymeric additives include rubber polymers such as hydrogenated butyl rubber. Examples of tackifying resins include MQ tackifying resins which have a three-dimensional silicate structure that is endcapped with trimethylsiloxy groups (OSiMe$_3$) and also contains some residual silanol functionality. Examples of plasticizers include oils such as mineral oils, silicone fluids, IPM (isopropyl myristate), and the like. Examples of fillers that can be used include zinc oxide, silica, carbon black, colorants (such as pigments and dyes), metal powders and particulate fillers such as carbon black, silica, titania, glass microspheres, calcium carbonate, and the like. Examples of stabilizers include antibacterial agents, thermal stabilizers, antioxidants, ultraviolet ("UV") stabilizers, and the like. Examples of property modifiers include thickening agents, curing agents, crosslinking agents and the like.

The reactive composition additionally comprises at least one initiator. The at least one initiator is a free radical initiator. A wide range of free radical initiators can be used. The most commonly used initiators are thermal initiators and photoinitiators. Thermal initiators are activated by heating the composition to the activation temperature, at which point the initiator decomposes to form free radicals which initiate the free radical polymerization. Photoinitiators are compounds that absorb light of a certain wavelength (typically ultraviolet or UV light) and decompose to form free radicals. In some embodiments, photoinitiators are particularly suitable as it can often be more convenient to initiate polymerization by exposing the composition to light than to heat the composition.

Typically the initiator or initiators comprise photoinitiators, meaning that the initiator is activated by light, typically ultraviolet (UV) light. Examples of suitable free radical photoinitiators include DAROCURE 4265, IRGACURE 651, IRGACURE 1173, IRGACURE 819, LUCIRIN TPO, LUCIRIN TPO-L, commercially available from BASF, Charlotte, N.C. Generally the photoinitiator is used in amounts of 0.01 to 1 parts by weight, more typically 0.1 to 0.5, parts by weight relative to 100 parts by weight of total free radically polymerizable components present in the composition.

A wide variety of compositions useful for a wide range of uses can be prepared using the siloxane-based polymers of this disclosure. Examples of such compositions include heat activated adhesives, pressure sensitive adhesives, gaskets, including cure in place gaskets, and the dental applications described in the copending application 62/095,113 filed on the same day as the present disclosure.

As mentioned above, the compositions can be prepared by blending the siloxane-based polymers with the additives either in a solvent or as a 100% solids mixture. In other embodiments, such as cure in place embodiments, the composition is a reactive mixture. This reactive mixture contains the free radically polymerizable compounds of Formula I, optional copolymerizable monomers, any desired additives, and an initiator.

This disclosure includes the following embodiments:
Among the embodiments are free radically polymerizable compounds. A first embodiment includes a free radically polymerizable compound comprising the formula:

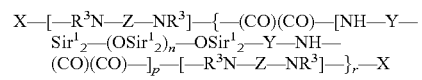

wherein each $R^1$ is independently an alkyl, haloalkyl, aralkyl, aryl, or aryl substituted with an alkyl, alkoxy, or halo; each Y is independently a divalent alkylene, aralkylene, or a combination thereof; each Z is independently a divalent or higher-valent polydiorganosiloxane, alkylene, aralkylene, heteroalkylene, or branched alkylene group; each $R^3$ is hydrogen or alkyl or $R^3$ taken together with Z and with the nitrogen to which they are both attached forms a heterocyclic group; each X is independently a free radically polymerizable group; n is independently an integer of 0 to 1500; p is an integer of 1 or greater; and r is an integer of 1 or greater.

Embodiment 2 is the free radically polymerizable compound of embodiment 1, wherein each $R^1$ is methyl.

Embodiment 3 is the free radically polymerizable compound of embodiment 1 or 2, wherein Y is an alkylene having 1 to 4 carbon atoms.

Embodiment 4 is the free radically polymerizable compound of any of embodiments 1-3, wherein Z is a —Y—$Sir^1_2$—$(OSir^1_2)_m$—$OSir^1_2$—Y— group wherein m is an integer of 0 to 1500.

Embodiment 5 is the free radically polymerizable compound of any of embodiments 1-3, wherein Z is an alkylene, aralkylene, heteroalkylene, or branched alkylene group comprising 2-20 carbon atoms.

Embodiment 6 is the free radically polymerizable compound of any of embodiments 1-5, wherein each X group comprises a (meth)acrylate group, an acrylamide group, or an ethylenically unsaturated aromatic group.

Embodiment 7 is the free radically polymerizable compound of any of embodiments 1-6, wherein the X group comprises a group with the structure: —A—O—(CO)—$CR^4$=$CH_2$; —A—(CO)—$CR^5_2$—NH—(CO)—CH=$CH_2$; or —A—Ar—$CR^4$=$CH_2$, wherein each A is a single bond or a linking group comprising —(CO)—NH—B—, where B is an alkylene group of from 1-4 carbon atoms; each $R^4$ is a hydrogen atom or an alkyl group of 1-4 carbon atoms; each $R^5$ is a methyl group; and Ar is a substituted or unsubstituted aromatic group.

Embodiment 8 is the free radically polymerizable compound of any of embodiments 1-7, wherein the X group comprises a group with the structure: —A—O—(CO)—$CR^4$=$CH_2$, wherein A is a linking group comprising —(CO)—NH—B—, where B is an ethylene group; and $R^4$ is a hydrogen atom or a methyl group.

Embodiment 9 is the free radically polymerizable compound of any of embodiments 1-7, wherein the X group comprises a group with the structure: —A—(CO)—$CR^5_2$—NH—(CO)—CH=$CH_2$, wherein A is a single bond; and each $R^5$ is a methyl group.

Embodiment 10 is the free radically polymerizable compound of any of embodiments 1-7, wherein the X group comprises a group with the structure: —A—Ar—$CR^4$=$CH_2$, wherein A is a linking group comprising —(CO)—NH—B—, where B is a dimethyl substituted methylene group; $R^4$ is a hydrogen atom or a methyl group: and Ar is a phenylene group.

Also disclosed are embodiments of methods of making free radically polymerizable compounds. Embodiment 11 includes a method of making a free radically polymerizable compound comprising mixing together under reaction conditions: a compound of the formula:

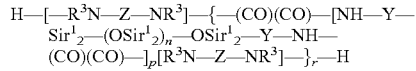

wherein each $R^1$ is independently an alkyl, haloalkyl, aralkyl, aryl, or aryl substituted with an alkyl, alkoxy, or halo; each Y is independently a divalent alkylene, aralkylene, or a combination thereof; each Z is independently a divalent or higher-valent polydiorganosiloxane, alkylene, aralkylene, heteroalkylene, or branched alkylene group; each $R^3$ is hydrogen or alkyl or $R^3$ taken together with Z and with the nitrogen to which they are both attached forms a heterocyclic group; n is independently an integer of 0 to 1500; p is an integer of 1 or greater; and r is an integer of 1 or greater; and an amine-reactive compound, wherein the amine-reactive compound comprises an isocyanate-functional (meth)acrylate, an isocyanate-functional vinyl-substituted aromatic compound, or a vinyl azlactone.

Embodiment 12 is the method of embodiment 11, wherein each $R^1$ is methyl.

Embodiment 13 is the method of embodiment 11 or 12, wherein Y is an alkylene having 1 to 4 carbon atoms.

Embodiment 14 is the method of any of embodiments 11-13, wherein Z is a —Y—$Sir^1_2$—$(OSir^1_2)_m$—$OSir^1_2$—Y— group wherein m is an integer of 0 to 1500.

Embodiment 15 is the method of any of embodiments 11-13, wherein Z is a divalent or trivalent alkylene, aralkylene, heteroalkylene, or branched alkylene group comprising 2-20 carbon atoms.

Embodiment 16 is the method of any of embodiments 11-15, wherein the amine-reactive compound comprises vinyl dimethyl azlactone, or a group with the structure: OCN—A—O—(CO)—$CR^4$=$CH_2$; or OCN—A—Ar—$CR^4$=$CH_2$, wherein each A is a linking group comprising an alkylene group of from 1-4 carbon atoms; each $R^4$ is a hydrogen atom or an alkyl group of 1-4 carbon atoms; Ar is a substituted or unsubstituted aromatic group.

Embodiment 17 is the method of any of embodiments 11-16, wherein the amine-reactive compound comprises a group with the structure: OCN—A—O—(CO)—$CR^4$=$CH_2$, wherein A is is an ethylene group; and $R^4$ is a hydrogen atom or a methyl group.

Embodiment 18 is the method of any of embodiments 11-16, wherein the amine-reactive compound comprises a group with the structure: OCN—A—Ar—$CR^4$=$CH_2$, wherein A is a dimethyl substituted methylene group; $R^4$ is a hydrogen atom or a methyl group: and Ar is a phenylene group.

Also disclosed are embodiments of polymers compositions. Embodiment 19 is a polymer composition comprising a polymer prepared from a reaction mixture comprising: a free radically polymerizable compound comprising the formula:

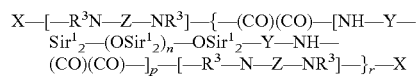

wherein each $R^1$ is independently an alkyl, haloalkyl, aralkyl, aryl, or aryl substituted with an alkyl, alkoxy, or halo; each Y is independently a divalent alkylene, aralkylene, or a combination thereof; each Z is independently a divalent or higher-valent polydiorganosiloxane, alkylene, aralkylene, heteroalkylene, or branched alkylene group; each $R^3$ is hydrogen or alkyl or $R^3$ taken together with Z and with the nitrogen to which they are both attached forms a heterocyclic group; each X is independently a free radically polymerizable group; n is independently an integer of 0 to 1500; p is an integer of 1 or greater; and r is an integer of 1 or greater; and an initiator.

Embodiment 20 is the polymer composition of embodiment 19, wherein the reaction mixture further comprises at least one additional free radically polymerizable monomer.

Embodiment 21 is the polymer composition of embodiment 20, wherein the at least one additional free radically polymerizable monomer comprises a (meth)acrylate monomer.

Embodiment 22 is the polymer composition of any of embodiments 19-21, wherein the reaction mixture further comprises at least one crosslinking agent.

Embodiment 23 is the polymer composition of any of embodiments 19-22, further comprising at least one additive.

Embodiment 24 is the polymer composition of embodiment 23, wherein the at least one additive comprises polymeric or copolymeric additives, tackifying resins, plasticizers, fillers, stabilizers, property modifiers, and combinations thereof.

Embodiment 25 is the polymer composition of any of embodiments 19-24, wherein the initiator comprises a photoinitiator.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, St. Louis, Mo. unless otherwise noted.

Table of Abbreviations

| Abbreviation or Trade Designation | Description |
|---|---|
| 3K PDMS dioxamido ester | Polydimethylsiloxane dioxamido ester prepared as described in preparative example 1 U.S. Pat. No. 7,501,184. Ester equivalent weight of 1775 grams/equivalent. |
| 3K PDMS diamine | Polydimethylsiloxane diamine with an average molecular weight of about 2,500 grams/mole, available from Wacker AG, Munich Germany as WACKER Fluid NH 40 D. Amine equivalent weight (AEW) of 1250 grams/equivalent. |
| 14K PDMS diamine | Polydimethylsiloxane diamine prepared as described in U.S. Pat. No. 6,534,615. Amine equivalent weight (AEW) of 6,007 grams/equivalent. |
| 14K PDMS dioxamido ester | Polydimethylsiloxane dioxamido ester prepared as described in preparative example 1 U.S. Pat. No. 7,501,184. Ester equivalent weight of 5640 grams/equivalent. |
| 41K PDMS diamine | Polydimethylsiloxane diamine prepared as described in U.S. Pat. No. 6,534,615. Amine equivalent weight (AEW) of 17,120 grams/equivalent. |
| PH1 | UV photoinitiator available from Ciba Specialty Chemicals Corporation, Tarrytown, NY as DAROCUR 4265. |
| EDA | 1,2-ethylenediamine |
| THF | tetrahydrofuran |
| IEM | 2-isocyanatoethyl methacrylate |
| AEW | Amine equivalent weight |
| Azlactone | Available from Polysciences, Inc., Warrington, PA as vinyl azlactone |
| TMI (META) | Available from Polysciences, Inc., Warrington, PA as alpha alpha-Dimethyl-3-Isopropenylbenzyl Isocyanate |
| MQ tackifier | A solution of 63 weight % MQ in xylenes available from Dow Corning as 2-7066 resin |
| PA-1 | Polyamine-1, a polyoxyalkylene diamine of "JEFFAMINE D2000" commercially available from Aldrich Chemical Company, INC. as poly(propylene glycol) bis(2-aminopropyl ether). |

Test Methods:
Titration Method to Determine Amine Equivalent Weight (AEW) of Diamines Approximately 1.5 grams (precisely weighed) of the precursor PDMS diamine was added to a 100 mL round-bottom flask with a magnetic stir bar. To the flask was added ~50 mL of THF solvent (not precisely measured) and the mixture stirred until the mixture was homogenous. Bromophenol blue indicator (2-3 drops of a saturated aqueous solution) was added and the contents stirred an additional 1-2 minutes until homogenous. The mixture was titrated to a yellow endpoint with 0.1N (or 0.01N) aqueous hydrochloric acid. The amine equivalent weight (grams/equivalent) was equal to the sample weight of the diamine precursor divided by the number of equivalents of hydrochloric acid.

Titration Method to Determine Equivalent Weight Oxamido Ester Terminated Siloxane Approximately 10 grams (precisely weighed) of the precursor PDMS dioxamido ester was added to a 100 mL round-bottom flask with a magnetic stir bar. The theoretical equivalent weight of the precursor was calculated and then an amount of N-hexylamine (precisely weighed) in the range of 3 to 4 times this number of equivalents was added. The flask was capped and stirred for a minimum of 24 hours. To the flask was added approximately 50 mL of THF solvent (not precisely measured) and bromophenol blue indicator (2-3 drops of a saturated aqueous solution) and the contents mixed an additional 1-2 minutes to combine. The mixture was titrated to a yellow endpoint with 0.2N aqueous hydrochloric acid. The oxamido ester equivalent weight (grams/equivalent) was equal to the number of equivalents of N-hexylamine added to the sample minus the number of equivalents of hydrochloric acid added during the titration. The equivalent weight (grams/equivalent) was equal to the sample weight of the oxamide ester precursor divided by the number of equivalents of the precursor.

Preparatory Example 1

A flame-dried, 250 mL, 2-necked round bottom flask equipped with a magnetic stir bar, thermometer, and a vacuum adaptor was charged with approximately 160 g a 14K PDMS diamine (AEW determined to be 6,007 grams/equivalent by titration). With stirring and under a reduced pressure (<1 torr), the flask was heated to >150° C. with a hot air gun for >10 minutes until bubbles were no longer generated. The heat was removed and the flask allowed to cool to <60° C. under vacuum. The flask was back-filled with dry nitrogen. From the flask was poured 141.24 grams ($2.35 \times 10^{-2}$ eq.) of the diamine into a flame-dried, 250 mL amber jar. To the amine was added 106.09 grams ($1.88 \times 10^{-2}$ eq.) of a 14K dioxamido ester (equivalent weight determine to 5640 grams/equivalent by titration). The jar was capped and vigorously shaken to combined and then placed on a roller mill. After 4 days, a sample of the mixture tested by $^1$H-NMR showed no oxamide ester. The AEW of the diamine oligomer was determined to be approximately 63,000 grams/equivalent by titration.

Example 1

A flame-dried, 250 mL amber jar was charged with 41.02 grams ($6.51 \times 10^{-4}$ eq.) of diamine oligomer from preparatory example 1, 61.53 grams of dry THF, and 0.12 grams ($7.7 \times 10^{-4}$ eq.) of IEM. The jar was capped, shaken vigorously to combine, and placed on a roller mill. After 4 days, a small aliquot was removed and the THF removed under reduced pressure. Analysis by $^1$H-NMR showed no methylene protons for a primary amine. Approximately 1 weight percent of PH1 was added to the methacryloxyurea and mixed to combine. A portion of the mixture was pour onto a TEFLON liner, dried in a hot-air oven at 40° C., and cured (total UV energy density of approximately 400 mJ/cm$^2$) using a UV processor (Model# QC120233AN, med. Pressure Hg lamp, RPC Industries, Plainfield, Ill.) under a nitrogen atmosphere to afford a hazy, tacky gum.

Preparatory Example 2

A sample of 41K PDMS diamine (approximately 1000 grams) was placed in a 2 liter, 3-neck reaction vessel equipped with a mechanical stirrer, a thermometer, and a vacuum adapter. With stirring and under a reduced pressure (<1 torr), the vessel was heated to >150° C. with a hot air gun for >10 minutes until bubbles were no longer generated. The heat was removed and the vessel allowed to cool to <60° C. under vacuum. The vessel was back-filled with dry nitrogen. From the vessel was poured 156.67 grams ($9.15 \times 10^{-3}$ eq.) of the 41K PDMS diamine into a flame-dried, 1 quart glass jar. To the amine was added 9.93 grams ($6.10 \times 10^{-3}$ eq.) of a 3K dioxamido ester (equivalent weight determine to 1,626 grams/equivalent by titration). The jar was capped and vigorously shaken to combined and then placed on a roller mill. After 4 days, a sample of the mixture tested by $^1$H-NMR showed no oxamide ester. The AEW was determined to be approximately 69,370 grams/equivalent by titration.

Example 2

A flame-dried, 250 mL amber jar was charged with 35.03 grams ($5.05 \times 10^{-4}$ eq.) of diamine oligomer from preparatory example 2, 69.5 grams of dry THF, and 0.109 grams ($7.02 \times 10^{-4}$ eq.) of IEM. The jar was capped, shaken vigorously to combine, and placed on a roller mill. After 24 hours, a small aliquot was removed and the THF removed under reduced pressure. Analysis by $^1$H-NMR showed no methylene protons for a primary amine. Approximately 1 weight percent of PH1 was added to the methacryloxyurea and mixed to combine. A portion of the mixture was pour onto a TEFLON liner, dried in a hot-air oven at 40° C., and cured (total UV energy density of approximately 400 mJ/cm$^2$) using a UV processor (Model# QC120233AN, med. Pressure Hg lamp, RPC Industries, Plainfield, Ill.) under a nitrogen atmosphere to afford a clear, slightly tacky, elastomer.

Preparatory Example 3

A 1 quart, clear glass jar was charged with 200.29 grams ($3.55 \times 10^{-2}$ eq.) of 14K PDMS dioxamido ester, 198.9 of dry THF, and 1.6175 grams ($5.38 \times 10^{-2}$ eq.) of EDA in 4.8 grams of dry THF. The jar was capped and vigorously shaken to combine and placed on a roller mill. After 5 days, the jar was removed from the mill and the contents poured into a TEFLON lined tray and placed in a hot-air oven at 50-65° C. to remove the THF over 24 hours. A sample of the rubbery oligomer was titrated to give an AEW of 14,590 grams/equivalent.

Example 3

A flame-dried, 250 mL amber jar was charged with 35.10 grams ($2.40 \times 10^{-3}$ eq.) of diamine oligomer from preparatory example 3 and 65 grams of dry THF. The jar was capped and placed on roller mill to dissolve the oligomer. To this solution was added 0.392 grams ($2.53 \times 10^{-3}$ eq.) of IEM. The jar was capped, shaken vigorously to combine, and placed on a roller mill. After 24 hours, a small aliquot was removed and the THF removed under reduced pressure. Analysis by $^1$H-NMR showed no methylene protons for a primary amine. Approximately 1 weight percent of PH1 was added to the methacryloxyurea and mixed to combine. A portion of the mixture was pour onto a TEFLON liner, dried in a hot-air oven at 40° C., and cured (total UV energy density of approximately 400 mJ/cm$^2$) using a UV processor (Model# QC120233AN, med. Pressure Hg lamp, RPC Industries, Plainfield, Ill.) under a nitrogen atmosphere to afford a clear, rubbery elastomer.

Preparatory Example 4

A flame-dried, 250 mL amber jar was charged with 60.09 grams ($1.06 \times 10^{-2}$ eq.) of 14K dioxamido ester and 40 of dry THF followed by 0.4583 grams ($1.52 \times 10^{-2}$ eq.) of EDA and 0.0411 grams ($8.43 \times 10^{4}$ eq.) of tris(2-aminoethyl)amine in approximately 9.5 grams of dry THF. The jar was capped and vigorously shaken to combine and placed on a roller mill. After 10 days, an aliquot of the mixture was removed and the THF removed under reduced pressure. The product was evaluated by $^1$H-NMR and no oxamido ester remained. The amine oligomer was titrated to give an AEW of approximately 10,400 grams/equivalent.

Example 4

To the 250 mL amber jar from preparatory example 4 containing 60.0 grams ($5.76 \times 10^{-3}$ eq.) of amine oligomer was added 1.0 grams ($6.44 \times 10^{-3}$ eq.) of IEM. The jar was capped and placed on a roller mill. After 3 days, a small aliquot was removed and the THF removed under reduced pressure. Analysis by $^1$H-NMR showed no methylene protons for a primary amine. Approximately 1 weight percent of PH1 was added to the methacryloxyurea based on solids and mixed to combine. A portion of the mixture was pour onto a TEFLON liner, dried in a hot-air oven at 40° C., and cured (total UV energy density of approximately 400 mJ/cm$^2$) using a UV processor (Model# QC120233AN, med. Pressure Hg lamp, RPC Industries, Plainfield, Ill.) under a nitrogen atmosphere to afford a slightly hazy elastomer.

Preparatory Example 5

A flame-dried, 250 mL round bottom flask with stifling bar was charged with 62.96 grams ($3.15 \times 10^{-2}$ moles) of PA-1 and 94.3 grams (0.64 moles) of diethyl oxalate. The flask was fitted with a reflux condenser and heated in an oil bath at 100° C. for 6 hours. The flask was then set up for simple vacuum distillation and under reduce pressure (~1 torr) ethanol and excess diethyl oxalate were removed to give 69.3 grams of the dioxamido ester as a viscous amber liquid. A flame-dried, 8 ounce, clear jar was charged with 22.32 grams ($2.0 \times 10^{-2}$ eq.) of the dioxamido ester and 38.22 grams ($3.01 \times 10^{-2}$ eq.) of 3K PDMS diamine. The jar was capped and vigorously shaken to combine and placed on a roller mill. After 3 days, the product was evaluated by $^1$H-NMR and no oxamido ester remained. The amine oligomer was titrated to give an AEW of approximately 7840 grams/equivalent.

Example 5

To the clear, 8 ounce, glass jar from preparatory example 5 containing 57.47 grams ($7.33 \times 10^{-3}$ eq.) of amine oligomer was added approximately 57 grams of dry THF and 1.25 grams ($8.05 \times 10^{-3}$ eq.) of IEM. The jar was capped and placed on a roller mill. After 2 days, approximately 1 weight percent (based on oligomer mass) of PH1 was added to the methacryloxyurea and mixed to combine. A portion of the mixture was pour onto a TEFLON liner, dried in a hot-air oven at 40° C., and cured (total UV energy density of approximately 400 mJ/cm$^2$) using a UV processor (Model# QC120233AN, med. Pressure Hg lamp, RPC Industries, Plainfield, Ill.) under a nitrogen atmosphere to afford a light yellow, slightly tacky elastomer.

Example 6

A flame-dried, 250 mL amber jar was charged with 43.00 grams ($6.88 \times 10^{-4}$ eq.) of diamine oligomer from preparatory example 1, 43.05 grams of dry THF, and 0.112 grams ($8.04 \times 10^{-4}$ eq.) of azlactone. The jar was capped, shaken vigorously to combine, and placed on a roller mill. After 18 hours, a small aliquot was removed and the THF removed under reduced pressure. Analysis by $^1$H-NMR showed no methylene protons for a primary amine. Approximately 1 weight percent of PH1 was added to the methacryloxyurea and mixed to combine. A portion of the mixture was pour onto a TEFLON liner, dried in a hot-air oven at 40° C., and cured (total UV energy density of approximately 400 mJ/cm$^2$) using a UV processor (Model# QC120233AN, med. Pressure Hg lamp, RPC Industries, Plainfield, Ill.) under a nitrogen atmosphere to afford a hazy, slightly tacky elastomer.

Preparatory Example 6

A flame-dried, 250 mL, 2-necked round bottom flask equipped with a magnetic stir bar, thermometer, and a vacuum adaptor was charged with 120.75 grams ($7.04 \times 10^{-3}$ eq.) of a 41K PDMS diamine (AEW determined to be 17120 grams/equivalent by titration). With stirring and under a reduced pressure (<1 torr), the flask was heated to >150° C. with a hot air gun for >10 minutes until bubbles were no longer generated. The heat was removed and the flask allowed to cool to <60° C. under vacuum. The flask was back-filled with dry nitrogen and the vacuum adaptor replaced with a rubber septum. To the amine was added 1.2767 grams ($8.33 \times 10^{-3}$ eq.) of IEM and the mixture vigorously stirred to combine. After approximately 16 hours, the contents of the flask was transferred to a 250 mL amber jar. No unreacted amine was detected by titration.

Preparatory Example 7

A 2-liter, 3-necked reaction vessel equipped with a mechanical stirrer, vacuum adapter and a thermometer was charged with approximately 1000 grams of 14K PDMA diamine (AEW determined to be 6,007 grams/equivalent by titration). With stirring and under a reduced pressure (<1 torr), the vessel was heated to >150° C. with a hot air gun for >10 minutes until bubbles were no longer generated. The heat was removed and the flask allowed to cool to <60° C. under vacuum. The flask was back-filled with dry nitrogen. From the vessel was poured 307.41 grams ($5.12 \times 10^{-2}$ eq.) of the diamine into a flame-dried 1 quart, clear jar. To the amine was added 192.41 grams ($3.41 \times 10^{-2}$ eq.) of a 14K dioxamido ester (equivalent weight determine to 5640 grams/equivalent by titration). The jar was capped and placed on a roller mill for 5 days. The AEW of the diamine oligomer was determined to be approximately 34,410 grams/equivalent by titration.

Example 7

A flame-dried, 250 mL amber jar was charged with 83.10 grams ($2.41 \times 10^{-3}$ eq.) of diamine oligomer from preparatory example 7, 30 grams of dry THF, and 0.71 grams ($8.04 \times 10^{-3}$ eq.) of TMI (META). The jar was capped, shaken vigorously to combine, and placed on a roller mill. After 18 hours, a small aliquot was removed and the THF removed under reduced pressure. Analysis by $^1$H-NMR showed no methylene protons for a primary amine. To a 120 mL, flame-dried, amber jar was added 14.36 grams of the above product mixture (10.57 grams solids), 12.19 grams of the 41K methacryloxyurea siloxane from preparatory example 6 and 0.23 grams of PH1. The mixture was shaken to combine. A portion of the mixture was poured onto a TEFLON liner, dried in a hot-air oven at 40° C., and cured (total UV energy density of approximately 400 mJ/cm$^2$) using a UV processor (Model# QC120233AN, med. Pressure Hg lamp, RPC Industries, Plainfield, Ill.) under a nitrogen atmosphere to afford a slightly hazy, slightly tacky elastomer.

Example 8

A flame-dried, 120 mL amber jar was charged with 18.41 grams of PH1 containing methacryloxyurea siloxane solution (6.44 grams solids) prepared in example 3. To this solution was added 10.23 grams of MQ tackifier. The mixture was shaken to combine and then heat at 60° C. for 30 minutes. A portion of the mixture was pour onto a TEFLON liner, dried in a hot-air oven at 40° C., and cured (total UV energy density of approximately 400 mJ/cm$^2$) using a UV processor (Model# QC120233AN, med. Pressure Hg lamp, RPC Industries, Plainfield, Ill.) under a nitrogen atmosphere to afford a slightly hazy, tacky elastomer.

What is claimed is:

1. A free radically polymerizable compound comprising the formula:

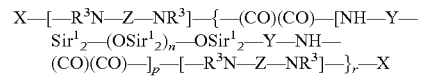

wherein each $R^1$ is independently an alkyl, haloalkyl, aralkyl, aryl, or aryl substituted with an alkyl, alkoxy, or halo;
each Y is independently a divalent alkylene, aralkylene, or a combination thereof;
each Z is independently a divalent or higher-valent polydiorganosiloxane, alkylene, aralkylene, heteroalkylene, or branched alkylene group;
each $R^3$ is hydrogen or alkyl or $R^3$ taken together with Z and with the nitrogen to which they are both attached forms a heterocyclic group;
each X is independently a free radically polymerizable group;
n is independently an integer of 0 to 1500;
p is an integer of 1 or greater; and
r is an integer of 1 or greater.

2. The free radically polymerizable compound of claim 1, wherein each $R^1$ is methyl.

3. The free radically polymerizable compound of claim 1, wherein Y is an alkylene having 1 to 4 carbon atoms.

4. The free radically polymerizable compound of claim 1, wherein Z is a —Y—$Sir^1_2$—$(OSir^1_2)_m$—$OSir^1_2$—Y— group wherein m is an integer of 0 to 1500.

5. The free radically polymerizable compound of claim 1, wherein Z is an alkylene, aralkylene, heteroalkylene, or branched alkylene group comprising 2-20 carbon atoms.

6. The free radically polymerizable compound of claim 1, wherein each X group comprises a (meth)acrylate group, an acrylamide group, or an ethylenically unsaturated aromatic group.

7. The free radically polymerizable compound of claim 1, wherein the X group comprises a group with the structure:
—A—O—(CO)—CR$^4$=CH$_2$; —A—(CO)—CR$^5_2$—NH—(CO)—CH=CH$_2$; or —A—Ar—CR$^4$=CH$_2$, wherein
each A is a single bond or a linking group comprising —(CO)—NH—B—, where B is an alkylene group of from 1-4 carbon atoms;
each R$^4$ is a hydrogen atom or an alkyl group of 1-4 carbon atoms;
each R$^5$ is a methyl group; and
Ar is a substituted or unsubstituted aromatic group.

8. The free radically polymerizable compound of claim 7, wherein the X group comprises a group with the structure:
—A—O—(CO)—CR$^4$=CH$_2$, wherein
A is a linking group comprising —(CO)—NH—B—, where B is an ethylene group; and
R$^4$ is a hydrogen atom or a methyl group.

9. The free radically polymerizable compound of claim 7, wherein the X group comprises a group with the structure:
—A—(CO)—CR$^5_2$—NH—(CO)—CH=CH$_2$,
wherein A is a single bond; and
each R$^5$ is a methyl group.

10. The free radically polymerizable compound of claim 7, wherein the X group comprises a group with the structure:
—A—Ar—CR$^4$=CH$_2$,
wherein A is a linking group comprising —(CO)—NH—B—, where B is a dimethyl substituted methylene group;
R$^4$ is a hydrogen atom or a methyl group: and
Ar is a phenylene group.

11. A method of making a free radically polymerizable compound comprising mixing together under reaction conditions:
a compound of the formula:

H—[—R$_3$N—Z—NR$^3$]—{—(CO)(CO)—[NH—Y—Sir$^1_2$—(OSir$^1_2$)$_n$—OSir$^1_2$—Y—NH—(CO)(CO)—]$_p$—[—R$^3$N—Z—NR$^3$]—}$_r$—H wherein each R$^1$ is independently an alkyl, haloalkyl, aralkyl, aryl, or aryl substituted with an alkyl, alkoxy, or halo;
each Y is independently a divalent alkylene, aralkylene, or a combination thereof;
each Z is independently a divalent or higher-valent polydiorganosiloxane, alkylene, aralkylene, heteroalkylene, or branched alkylene group;
each R$^3$ is hydrogen or alkyl or R$^3$ taken together with Z and with the nitrogen to which they are both attached forms a heterocyclic group;
n is independently an integer of 0 to 1500;
p is an integer of 1 or greater; and
r is an integer of 1 or greater; and
an amine-reactive compound, wherein the amine-reactive compound comprises an isocyanate-functional (meth)acrylate, an isocyanate-functional vinyl-substituted aromatic compound, or a vinyl azlactone.

12. The method of claim 11, wherein Z is a —Y—Sir$^1_2$—(OSir$^1_2$)$_m$—OSir$^1_2$—Y— group wherein m is an integer of 0 to 1500.

13. The method of claim 11, wherein Z is an divalent or trivalent alkylene, aralkylene, heteroalkylene, or branched alkylene group comprising 2-20 carbon atoms.

14. The method of claim 11, wherein the amine-reactive compound comprises vinyl dimethyl azlactone, or a group with the structure:
OCN—A—O—(CO)—CR$^4$=CH$_2$; or OCN—A—Ar—CR$^4$=CH$_2$, wherein
each A is a linking group comprising an alkylene group of from 1-4 carbon atoms;
each R$^4$ is a hydrogen atom or an alkyl group of 1-4 carbon atoms;
Ar is a substituted or unsubstituted aromatic group.

15. The method of claim 14, wherein the amine-reactive compound comprises a group with the structure:
OCN—A—O—(CO)—CR$^4$=CH$_2$, wherein
A is is an ethylene group; and
R$^4$ is a hydrogen atom or a methyl group.

16. The method of claim 14, wherein the amine-reactive compound comprises a group with the structure:
OCN—A—Ar—CR$^4$=CH$_2$, wherein
A is a dimethyl substituted methylene group;
R$^4$ is a hydrogen atom or a methyl group: and
Ar is a phenylene group.

17. A polymer composition comprising a polymer prepared from a reaction mixture comprising:
a free radically polymerizable compound comprising the formula:
X—[—R$^3$N—Z—NR$^3$]—{—(CO)(CO)—[NH—Y—Sir$^1_2$—(OSir$^1_2$)$_n$—OSir$^1_2$—Y—NH—(CO)(CO)—]$_p$—[—R$^3$N—Z—NR$^3$]—}$_r$—X
wherein each R$^1$ is independently an alkyl, haloalkyl, aralkyl, aryl, or aryl substituted with an alkyl, alkoxy, or halo;
each Y is independently a divalent alkylene, aralkylene, or a combination thereof;
each Z is independently a divalent or higher-valent polydiorganosiloxane, alkylene, aralkylene, heteroalkylene, or branched alkylene group;
each R$^3$ is hydrogen or alkyl or R$^3$ taken together with Z and with the nitrogen to which they are both attached forms a heterocyclic group;
each X is independently a free radically polymerizable group;
n is independently an integer of 0 to 1500;
p is an integer of 1 or greater; and
r is an integer of 1 or greater; and
an initiator.

18. The polymer composition of claim 17, wherein the reaction mixture further comprises at least one additional free radically polymerizable monomer.

19. The polymer composition of claim 17, wherein the reaction mixture further comprises at least one crosslinking agent.

20. The polymer composition of claim 17, further comprising at least one additive.

* * * * *